United States Patent
Han (10) Patent No.: US 9,843,946 B2
(45) Date of Patent: Dec. 12, 2017

(54) APPARATUSES AND METHODS FOR REDUCING CALL RECOVERY TIME ASSOCIATED WITH A CELL UPDATE PROCEDURE

(71) Applicant: MediaTek Inc., Hsin-Chu (TW)

(72) Inventor: Shang-Yu Han, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 112 days.

(21) Appl. No.: 14/938,119

(22) Filed: Nov. 11, 2015

(65) Prior Publication Data

US 2016/0219488 A1    Jul. 28, 2016

Related U.S. Application Data

(60) Provisional application No. 62/108,635, filed on Jan. 28, 2015.

(51) Int. Cl.
*H04W 36/00* (2009.01)
*H04W 24/04* (2009.01)
*H04W 48/20* (2009.01)

(52) U.S. Cl.
CPC ............ *H04W 24/04* (2013.01); *H04W 48/20* (2013.01)

(58) Field of Classification Search
CPC .............................. H04W 24/04; H04W 48/20
USPC ............................................ 455/437; 370/338
See application file for complete search history.

(56) References Cited

U.S. PATENT DOCUMENTS

2013/0100895 A1* 4/2013 Aghili ............... H04W 4/00 370/329
2015/0282010 A1* 10/2015 Yang ............... H04W 36/0016 455/437

* cited by examiner

*Primary Examiner* — Marcos Batista
(74) *Attorney, Agent, or Firm* — McClure, Qualey & Rodack, LLP (57) ABSTRACT

A method for a mobile communication device to reduce call recovery time associated with a cell update procedure is provided. The method includes the steps of: detecting an Access Stratum (AS) abnormality when making a call in a third-generation (3G) cellular network; decreasing one or more parameters, which are obtained from the 3G cellular network, associated with the cell update procedure in response to detecting the AS abnormality; and applying the decreased parameters for the cell update procedure to enable an early cell reselection procedure.

19 Claims, 7 Drawing Sheets

APPARATUSES AND METHODS FOR REDUCING CALL RECOVERY TIME ASSOCIATED WITH A CELL UPDATE PROCEDURE

CROSS REFERENCE TO RELATED APPLICATIONS

This Application claims priority of U.S. Provisional Application No. 62/108,635, filed on Jan. 28, 2015, the entirety of which is incorporated by reference herein.

BACKGROUND OF THE INVENTION

Field of the Invention

The invention generally relates to handling abnormal cases occurred during call setup, and more particularly, to apparatuses and methods for reducing call recovery time associated with the cell update procedure.

Description of the Related Art

With growing demand for ubiquitous computing and networking, various cellular technologies have been developed, including the Global System for Mobile communications (GSM) technology, General Packet Radio Service (GPRS) technology, Enhanced Data rates for Global Evolution (EDGE) technology, Wideband Code Division Multiple Access (WCDMA) technology, High Speed Packet Access (HSPA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

Take the WCDMA technology in compliance with the 3rd Generation Partnership Project (3GPP) Technical Specification (TS) 25.331 as an example. When detecting an abnormal situation (e.g., radio link failure) during a call establishment, a User Equipment (UE) should enter the CELL_FACH state from the CELL_DCH state, and perform the cell update procedure to recover the call. However, if the signal quality of the serving cell is bad, the cell update procedure may fail and the UE has to retry the cell update procedure until the maximum retry limit is reached. For example, in some WCDMA networks, the maximum retry limit may be set to 7 and the retry timer specifying the period of time between every two successive retries of the cell update procedure may be set to 8 seconds. As a result, the UE may spend at least 56 seconds in performing the cell update procedure for 7 times before it can release the signaling connection(s) and radio access bearer(s) to enter the RRC IDLE state in which it may reselect to a more suitable cell. That is, the user may experience an extremely long delay in obtaining services.

BRIEF SUMMARY OF THE INVENTION

In order to solve the aforementioned problem, the invention proposes to scale down the values of the cell update parameters for reducing retries of the cell update procedure, so that the UE may be allowed to reselect to a more suitable cell as soon as possible.

In a first aspect of the invention, a method for a mobile communication device to reduce call recovery time associated with a cell update procedure is provided. The method comprises the steps of: detecting an Access Stratum (AS) abnormality when making a call in a third-generation (3G) cellular network; decreasing one or more parameters, which are obtained from the 3G cellular network, associated with the cell update procedure in response to detecting the AS abnormality; and applying the decreased parameters for the cell update procedure to enable an early cell reselection procedure.

In a second aspect of the invention, a mobile communication device comprising a Baseband processor is provided. The Baseband processor is configured to detect an AS abnormality when making a call in a 3G cellular network, reduce one or more parameters, which are obtained from the 3G cellular network, associated with a cell update procedure in response to detecting the AS abnormality, and apply the decreased parameters for the cell update procedure to enable an early cell reselection procedure.

In a third aspect of the invention, a mobile communication device comprising a Baseband chip and a controller is provided. The Baseband chip is configured to detect an AS abnormality when making a call in a cell of a 3G cellular network. The controller is configured to reduce one or more parameters, which are obtained from the 3G cellular network, associated with a cell update procedure in response to detecting the AS abnormality, and instructs the Baseband processor to apply the decreased parameters for the cell update procedure to enable an early cell reselection procedure.

Other aspects and features of the present invention will become apparent to those with ordinarily skill in the art upon review of the following descriptions of specific embodiments of the mobile communication devices and the methods for reducing call recovery time associated with the cell update procedure.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. The 3GPP specification described herein is used to teach the spirit of the invention, and the invention is not limited thereto.

Figure 1:
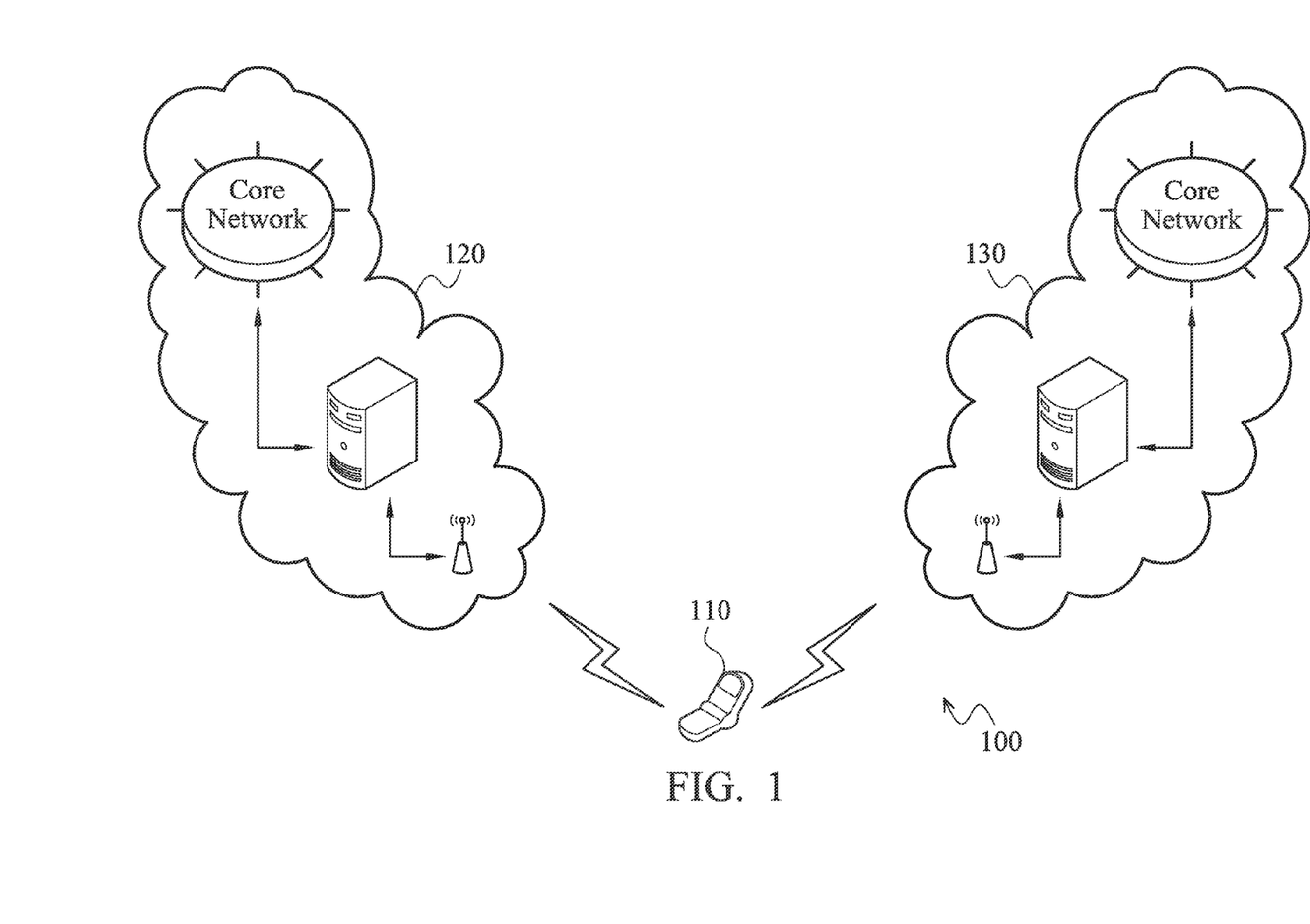
FIG. 1 is a block diagram illustrating a wireless communications environment according to an embodiment of the invention.

FIG. 1 is a block diagram illustrating a wireless communications environment according to an embodiment of the invention. The wireless communications environment 100 comprises a mobile communication device 110, and service networks 120 and 130. The service network 120 is a 3G telecommunication network (e.g., a WCDMA or HSPA network), while the service network 130 is a fourth-generation (4G) telecommunication network (e.g., an LTE, TD-LTE, or LTE-A network). The mobile communication device 110 may selectively communicate with one of the service networks 120 and 130. That is, the mobile communication device 110 may be a multimode mobile phone which supports multiple cellular technologies using one or more subscriber identity cards.

Each of the service networks 120 and 130 may comprise an access network and a core network. Using the service network 120 being a WCDMA network as an example, the access network may be a Universal Terrestrial Radio Access Network (UTRAN) which includes at least a Node B and a Radio Network Controller (RNC), and the core network may be a GPRS core which includes at least a Home Location Register (HLR), at least one Serving GPRS Support Node (SGSN), at least one Gateway GPRS Support Node (GGSN). Using the service network 130 being an LTE network as an example, the access network may be an Evolved-UTRAN (E-UTRAN) which includes at least an evolved NodeB (eNB), and the core network may be an Evolved Packet Core (EPC) which includes at least a Home Subscriber Server (HSS), Mobility Management Entity (MME), Serving Gateway (S-GW), Packet Data Network Gateway (PDN-GW or P-GW).

The mobile communication device 110 may obtain mobile services, including Circuit-Switched (CS) and Packet-Switched (PS) services, from the service network 120, or obtain only PS services from the service network 130. The CS services may include voice call services, and Short Message Service (SMS), etc., and the PS services may include data services, such as e-mail transmission, web browsing, file upload/download, instant messaging, streaming video, Voice over IP (VoIP), or others. In another embodiment, the mobile communication device 110 may serve as an external data card for a computer host, notebook, or panel PC to access Internet resources.

Figure 2:
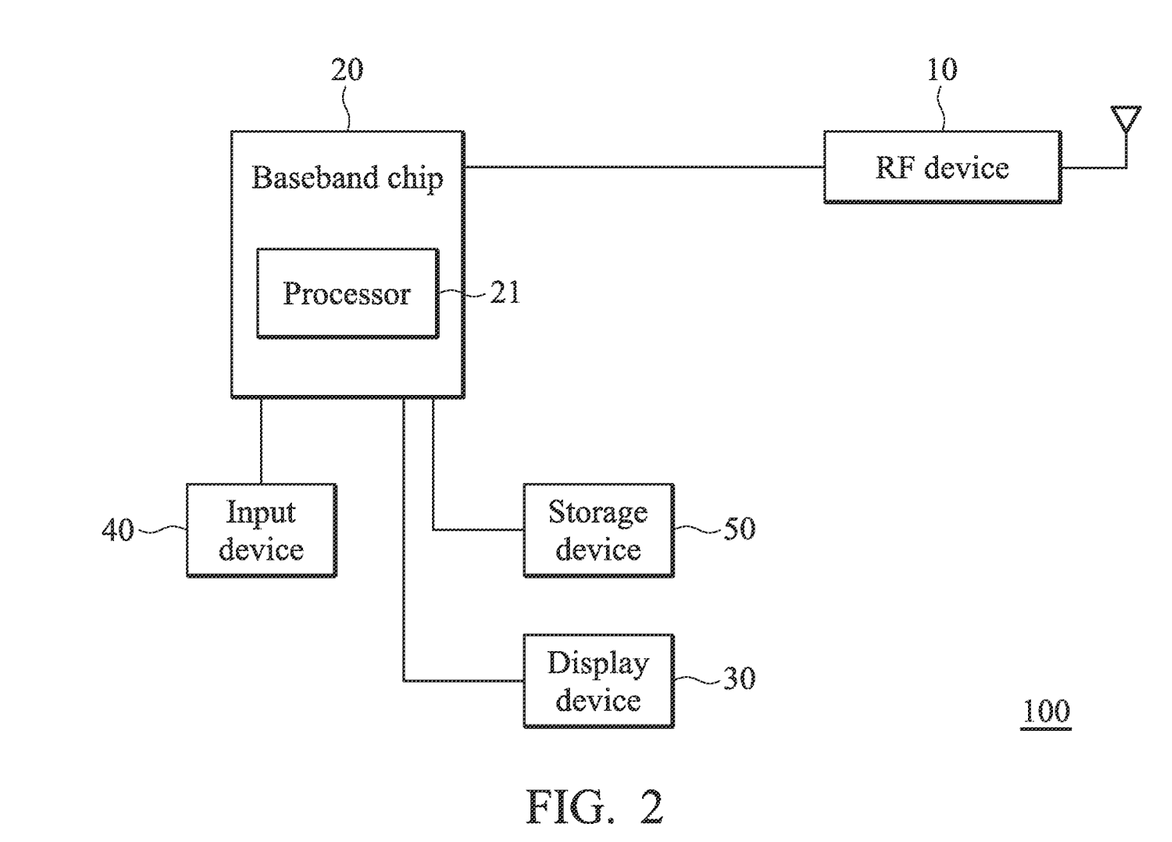
FIG. 2 is a block diagram illustrating the mobile communication device 110 according to an embodiment of the invention.

FIG. 2 is a block diagram illustrating the mobile communication device 110 according to an embodiment of the invention. The mobile communication device 110 comprises a Radio Frequency (RF) device 10, a Baseband chip 20, a display device 30, an input device 40, and a storage device 50, wherein the RF device 10, the display device 30, the input device 40, and the storage device 50 are coupled to the Baseband chip 20. The Baseband chip 20 comprises a processor 21 which is responsible for loading and executing the communication protocol in use between the mobile communication device 110 and the service networks 120 and 130 to enable wireless communications with the service networks 120 and 130 via the RF device 10, sending a series of frame data (e.g. representing text messages, graphics, images or others) to the display device 30, receiving signals from the input device 40, and storing and retrieving data to and from the storage device 50. Most importantly, the processor 21 coordinates the above-mentioned operations of the RF device 10, the display device 30, the input device 40, and the storage device 50 for performing the method for reducing call recovery time associated with the cell update procedure.

In one embodiment, the Baseband chip 20 and the RF device 10 may be incorporated into a Modem. Additionally, the Baseband chip 20 may further contain other hardware components to perform baseband signal processing, including Analog-to-Digital Conversion (ADC)/Digital-to-Analog Conversion (DAC), gain adjusting, modulation/demodulation, encoding/decoding, and so on. The RF device 10 may receive RF wireless signals via the antenna, convert the received RF wireless signals to baseband signals, which are processed by the Baseband chip 20, or receive baseband signals from the Baseband chip 20 and convert the received baseband signals to RF wireless signals, which are later transmitted via the antenna. The RF device 10 may also contain multiple hardware devices to perform radio frequency conversion. For example, the RF device 10 may comprise a mixer to multiply the baseband signals with a carrier oscillated in the radio frequency of the supported cellular technology, wherein the radio frequency may be 900 MHz, 1900 MHz or 2100 MHz utilized in WCDMA/HSPA technology, or may be 900 MHz, 2100 MHz, or 2.6 GHz utilized in LTE/LTE-A/TD-LTE technology, or others, depending on the cellular technology in use.

The display device 30 may be a Liquid-Crystal Display (LCD), Light-Emitting Diode (LED) display, or Electronic Paper Display (EPD), etc., for providing a display function. Alternatively, the display device 30 may further comprise one or more touch sensors disposed thereon or thereunder for sensing touches, contacts, or approximations of objects, such as fingers or styluses.

The input device 40 may comprise one or more buttons, a keyboard, a mouse, a touch pad, a video camera, a microphone, and/or a speaker, etc., serving as the Man-Machine Interface (MMI) for interaction with users.

The storage device 50 may be a memory, such as a FLASH memory or a Non-volatile Random Access Memory (NVRAM), or a magnetic storage device, such as a hard disk or a magnetic tape, or an optical disc, or any combination thereof for storing communication data, including the cell update parameters received from the service network 120.

Figure 3:
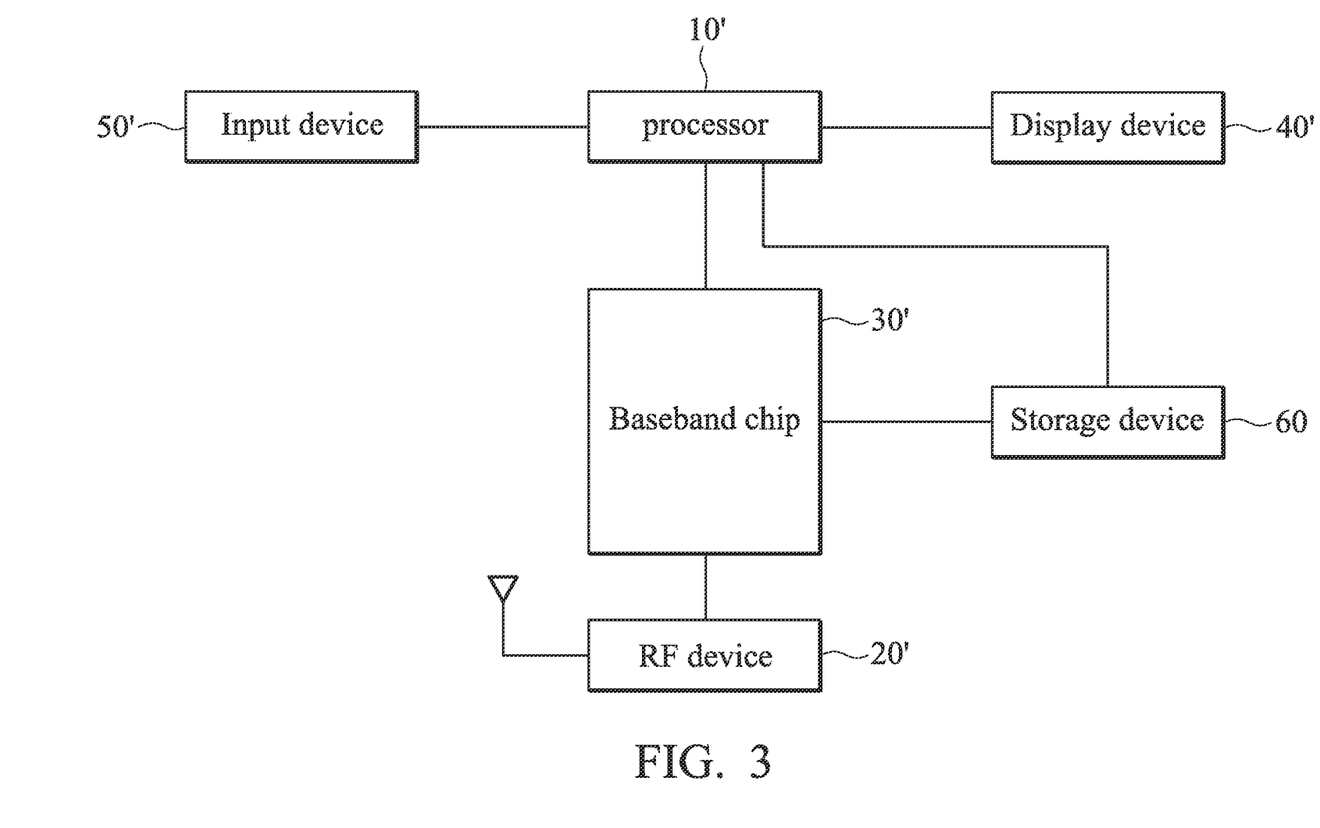
FIG. 3 is a block diagram illustrating the mobile communication device 110 according to another embodiment of the invention.

FIG. 3 is a block diagram illustrating the mobile communication device 110 according to another embodiment of the invention. The mobile communication device 110 comprises a controller 10', a Radio Frequency (RF) device 20', a Baseband chip 30', a display device 40', an input device 50', and a storage device 60, wherein the RF device 20' and the storage device 60 are coupled to the Baseband chip 30', and the Baseband chip 30', the display device 40', the input device 50', and the storage device 60 are coupled to the controller 10'. The controller 10' may be a general-purpose processor, an application processor, a Digital Signal Processor (DSP), or others, which is responsible for executing an Operating System (OS) (e.g., Android or iOS) and applications, controlling the Baseband chip 30' for wireless communications with the service networks 120 and 130 via the RF device 20', sending a series of frame data (e.g. representing text messages, graphics, images or others) to the display device 40', receiving signals from the input device 50', and storing and retrieving data to and from the storage device 60. Most importantly, the controller 10' coordinates the above-mentioned operations of the Baseband chip 30', the display device 40', the input device 50', and the storage device 60 for performing the method for reducing call recovery time associated with the cell update procedure. The detailed description of the RF device 20', the Baseband chip 30', the display device 40', the input device 50', and the storage device 60 is similar to the embodiment of FIG. 2, and thus, is omitted herein for brevity.

Figure 4:
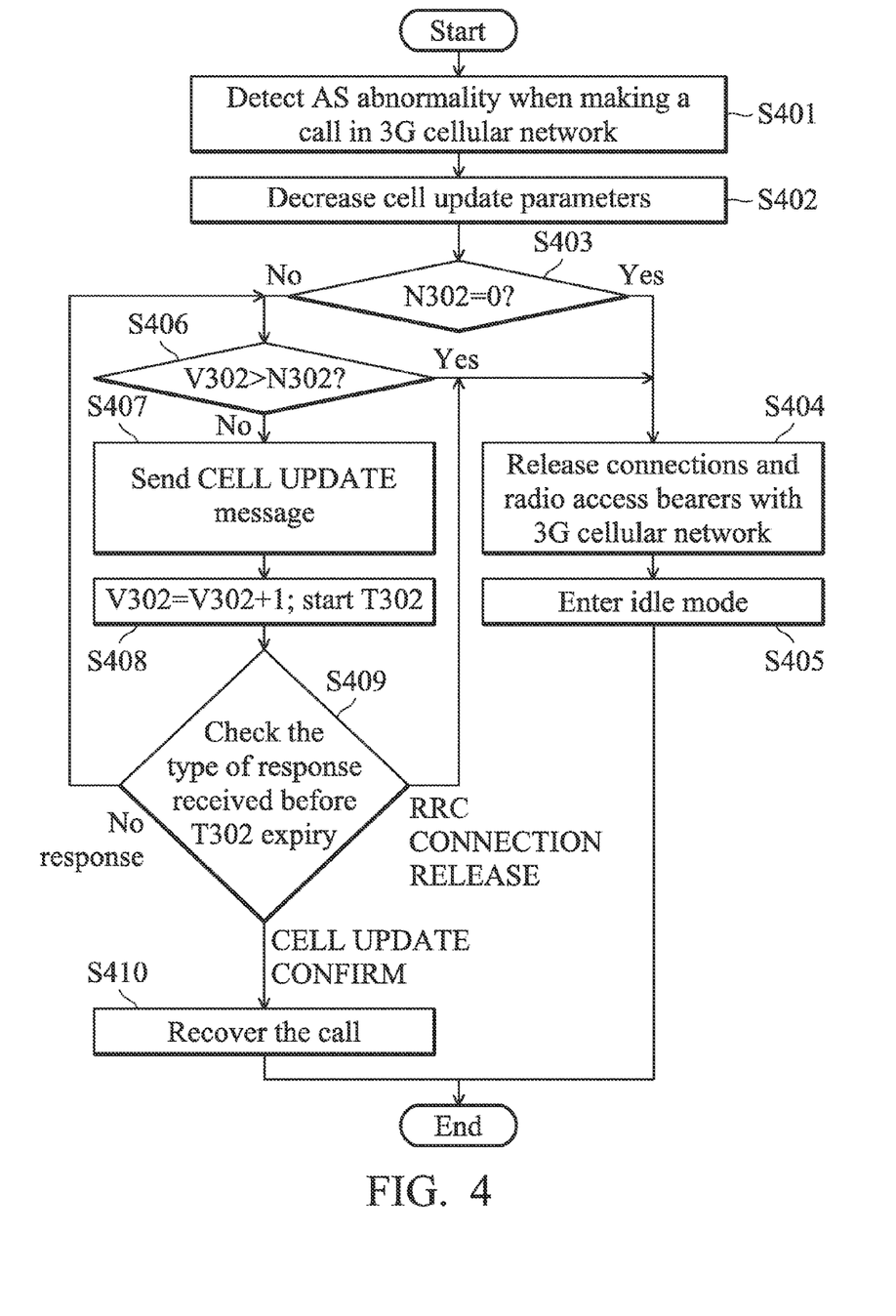
FIG. 4 is a flow chart illustrating the method for reducing call recovery time associated with the cell update procedure according to an embodiment of the invention.

FIG. 4 is a flow chart illustrating the method for reducing call recovery time associated with the cell update procedure according to an embodiment of the invention. In this embodiment, the method is applied to a mobile communication device which is initially configured to operate in a connected mode, e.g., the RRC CONNECTED mode, for making a call in a 3G cellular network. For example, the call request may be initiated by the 3G cellular network, or may be initiated by a 4G cellular network (i.e., the call being a CSFB call). To begin, the mobile communication device detects an Access Stratum (AS) abnormality when making a call in the 3G cellular network (step S401). The AS abnormality may refer to a situation where the current cell in the 3G cellular network may not be able to provide normal services to the mobile communication device. For example, the AS abnormality may indicate a radio link failure or an RLC unrecoverable error.

Next, the mobile communication device decreases the cell update parameters obtained from the 3G cellular network in response to detecting the AS abnormality (step S402). The cell update parameters may be obtained from the 3G cellular network via a system information broadcast (SIB), such as a type 1 SIB, or via a dedicated message, such as a UTRAN MOBILITY INFORMATION message. Specifically, the cell update parameters comprise a parameter "N302" for specifying the maximum number of retries for the cell update procedure, and a parameter "T302" for specifying the period of time between every two successive retries of the cell update procedure. The mobile communication device may decrease the cell update parameters by setting the parameter "N302" to an integer between 0 and half of its original value, and setting the parameter "T302" to 1 or half of its original value in seconds.

After that, the mobile communication device applies the decreased cell update parameters for the cell update procedure to enable an early cell reselection procedure. Specifically, the mobile communication device first determines whether the decreased parameter "N302" has a zero value (step S403), and if so, releases the established signaling connections and radio access bearers with the 3G cellular network (step S404), and enters the idle mode, e.g., the RRC IDLE mode (step S405). Otherwise, if the decreased parameter "N302" has a non-zero value, the mobile communication device determines whether the cell update counter "V302" is greater than the decreased parameter "N302" (step S406), wherein the cell update counter "V302" is initially set to 0 before starting the cell update procedure. If the cell update counter "V302" is greater than the decreased parameter "N302", the method proceeds to step S404. Otherwise, if the cell update counter "V302" is less than or equal to the decreased parameter "N302", the mobile communication device sends a CELL UPDATE message to the 3G cellular network (step S407), increments the cell update counter "V302" by 1, and starts the retry timer T302 with the decreased parameter "T302" (step S408).

Subsequent to step S408, the mobile communication device determines whether a CELL UPDATE CONFIRM message or an RRC CONNECTION RELEASE message is received, or no response is received before the retry timer T302 expires (step S409). If a CELL UPDATE CONFIRM message is received before the retry timer T302 expires, the mobile communication device processes the message to recover the call (step S410), and the method ends. If an RRC CONNECTION RELEASE message is received before the retry timer T302 expires, the method proceeds to step S404. If no response is received before the retry timer T302 expires, the method proceeds to step S406.

In one embodiment, when the parameter "N302" is set to 0 in step S402, the mobile communication device will skip the cell update procedure and enter the idle mode directly, so that the cell reselection procedure may be performed earlier. In another embodiment, when the parameter "N302" is set to a non-zero value in step S402, the mobile communication device will perform the cell update procedure according to the decreased cell update parameters, and then enter the idle mode in response to failing the cell update procedure for the number of retries corresponding to the decreased parameter "N302".

In one embodiment, if the call is a CSFB call, the early cell reselection procedure may allow the mobile communication device to fast camp back to the 4G cellular network.

Please note that, by decreasing the cell update parameters, the mobile communication device may cut down on the number of retries of the cell update procedure or just skip the cell update procedure. Therefore, the call recovery time may be efficiently reduced. For example, if the original value, e.g., 7, of the parameter "N302" is adjusted to 3 and the original value, e.g., 8 seconds, of the parameter "T302" is adjusted to 4, then at least 7*8−3*4=44 seconds can be saved with the proposed method of the invention. Alternatively, if the original value of the parameter "N302" is adjusted to 0, then as much as 7*8=56 seconds can be saved.

Figure 5A:
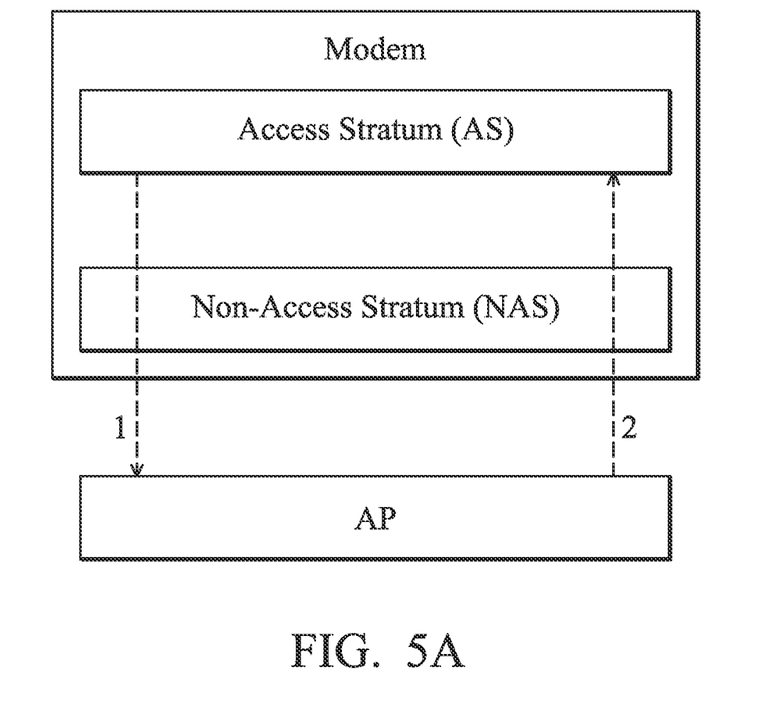
FIGS. 5A to 5C show schematic diagrams of three exemplary communications between the protocol layers to carry out the method for reducing call recovery time associated with the cell update procedure.
Figure 5B:
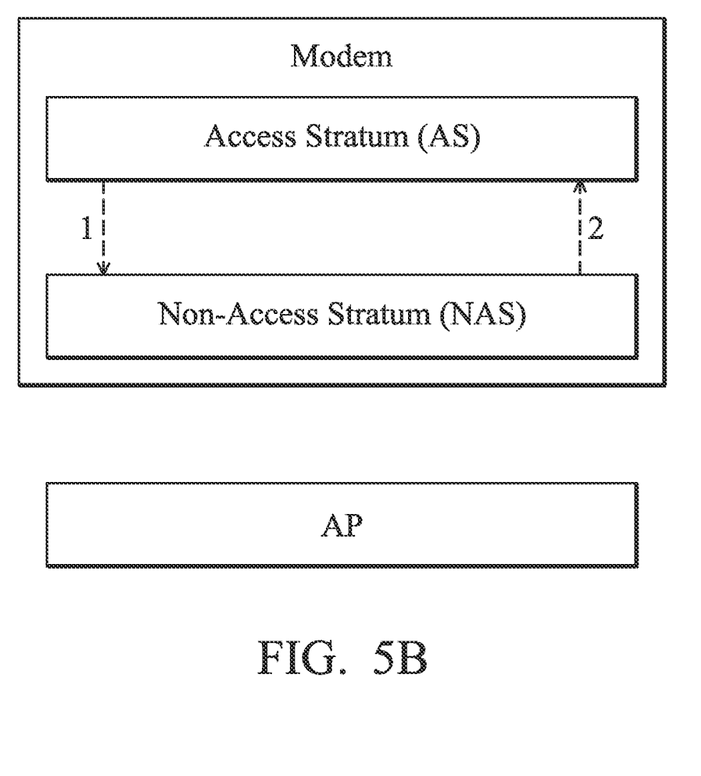
Figure 5C:
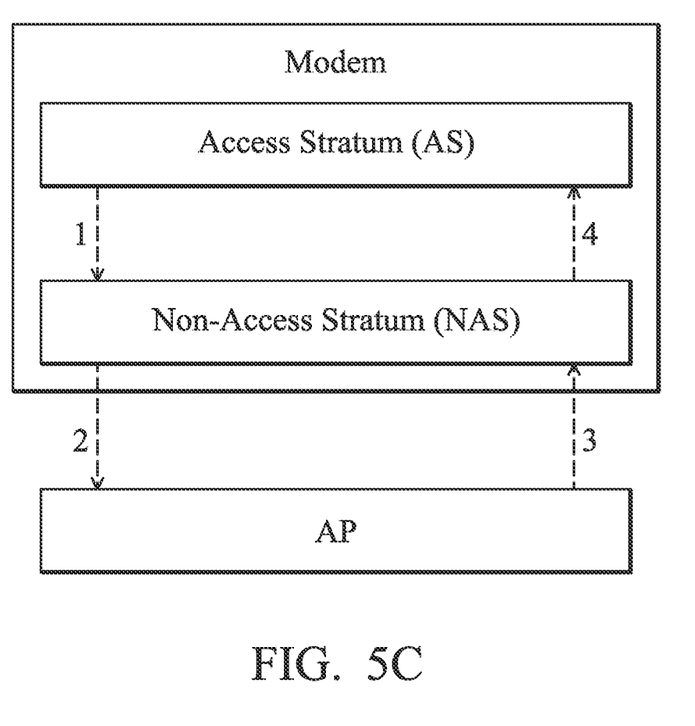

FIGS. 5A to 5C show schematic diagrams of three exemplary communications between the protocol layers to carry out the method for reducing call recovery time associated with the cell update procedure. The protocol layers comprise the AS, the Non-AS (NAS), and the Application (AP) layer. Specifically, the AS and the NAS belong to the communication protocol used for wireless communication with the 3G/4G cellular network, which is generally loaded and executed by a Modem. The AS may include a Physical (PHY) layer, a Medium Access Control (MAC) layer, a Radio Link Control (RLC) layer, a Packet Data Convergence Protocol (PDCP), and a Radio Resource Control (RRC) layer, wherein the PHY layer may be referred to as layer 1 of the protocol layers, the combination of the MAC layer, RLC layer, and the PDCP layer may be referred to as layer 2 of the protocol layers, and the combination of the RRC layer and the NAS may be referred to as layer 3 of the protocol layers. The AP layer may be referred to as layer 4 of the protocol layers. The AP may represent the Operating System (OS) of the mobile communication device, such as Android or iOS, and is generally executed outside of the Modem.

As shown in FIG. 5A, the AS notifies the AP layer when it detects the AS abnormality as described in step S401. The AP layer decides how to decrease the cell update parameters as described in step S402 when notified by the AS, and then indicates the decreased cell update parameters to the AS, so that the AS may apply the decreased cell update parameters for the cell update procedure as described in steps S403 to S410.

As shown in FIG. 5A, the AS notifies the AP layer when it detects the AS abnormality as described in step S401. The AP layer decides how to decrease the cell update parameters as described in step S402 when notified by the AS, and then indicates the decreased cell update parameters to the AS, so that the AS may apply the decreased cell update parameters for the cell update procedure as described in steps S403 to S410.

As shown in FIG. 5B, the AS notifies the NAS when it detects the AS abnormality as described in step S401. The NAS decides how to decrease the cell update parameters as described in step S402 when notified by the AS, and then indicates the decreased cell update parameters to the AS, so that the AS may apply the decreased cell update parameters for the cell update procedure as described in steps S403 to S410.

As shown in FIG. 5C, the AS notifies the NAS when it detects the AS abnormality as described in step S401, and then the NAS forwards the notification to the AP layer. The AP layer decides how to decrease the cell update parameters as described in step S402 when receiving the notification, and indicates the decreased cell update parameters to the NAS which further forwards the decreased cell update parameters to the AS. After that, the AS may apply the decreased cell update parameters for the cell update procedure as described in steps S403 to S410.

While the invention has been described by way of example and in terms of preferred embodiment, it is to be understood that the invention is not limited thereto. Those who are skilled in this technology can still make various alterations and modifications without departing from the scope and spirit of this invention. For example, the method of FIG. 4 may be implemented in program code stored in a machine-readable storage medium, such as a magnetic tape, semiconductor, magnetic disk, optical disc (e.g., CD-ROM, DVD-ROM, etc.), or others, which is loaded and executed by the Baseband processor 21 and/or the controller 10' of the mobile communication device 110. Therefore, the scope of the present invention shall be defined and protected by the following claims and their equivalents.

What is claimed is:

1. A method for a mobile communication device to reduce a call recovery time associated with a cell update procedure, comprising:
    detecting a radio link failure or Radio Link Control (RLC) unrecoverable error when making a call in a third-generation (3G) cellular network;
    decreasing one or more parameters, which are obtained from the 3G cellular network, associated with the cell update procedure in response to detecting the radio link failure or RLC unrecoverable error; and
    applying the decreased parameters for the cell update procedure to reduce the call recovery time for retrying the cell update procedure.

2. The method of claim 1, wherein the parameters comprise a first parameter "N302" for specifying a maximum number of retries for the cell update procedure, and a second parameter "T302" for specifying a period of time between every two successive retries of the cell update procedure.

3. The method of claim 2, wherein the step of decreasing the parameters comprises setting the first parameter "N302" to an integer between 0 and half of the first parameter "N302", and setting the second parameter "T302" to 1 or half of the second parameter "T302" in seconds.

4. The method of claim 3, wherein, when the first parameter "N302" is set to 0, the step of applying the decreased parameters for the cell update procedure comprises skipping the cell update procedure and entering an idle mode in the 3G cellular network to allow an early cell reselection procedure.

5. The method of claim 3, wherein, when the first parameter "N302" is set to a non-zero value, the step of applying the decreased parameters for the cell update procedure comprises performing the cell update procedure according to the decreased parameters.

6. The method of claim 5, further comprising:
    entering an idle mode in the 3G cellular network to allow an early cell reselection procedure, in response to failing the cell update procedure for a number of retries corresponding to the decreased first parameter "N302".

7. The method of claim 1, wherein the AS abnormality is indicated from an AS to a Non-AS (NAS), and the step of decreasing the parameters is performed by the NAS which instructs the AS to perform the step of applying the decreased parameters for the cell update procedure.

8. The method of claim 1, wherein the AS abnormality is indicated from an AS to an Application (AP) layer, and the step of decreasing the parameters is performed by the AP layer which instructs the AS to perform the step of applying the decreased parameters for the cell update procedure.

9. The method of claim 1, wherein the AS abnormality is indicated from an AS to an Application (AP) layer through a Non-AS (NAS), and the step of decreasing the parameters is performed by the AP layer which instructs the AS, through the NAS, to perform the step of applying the decreased parameters for the cell update procedure.

10. A mobile communication device, comprising:
    a Baseband processor configured to detect a radio link failure or Radio Link Control (RLC) unrecoverable error when making a call in a third-generation (3G) cellular network, reduce one or more parameters, which are obtained from the 3G cellular network, associated with a cell update procedure in response to detecting the radio link failure or RLC unrecoverable error, and apply the decreased parameters for the cell update procedure to reduce a call recovery time for retrying the cell update procedure.

11. The mobile communication device of claim 10, wherein the parameters comprise a first parameter "N302" for specifying a maximum number of retries for the cell update procedure, and a second parameter "T302" for specifying a period of time between every two successive retries of the cell update procedure.

12. The mobile communication device of claim 11, wherein the step of decreasing the parameters comprises setting the first parameter "N302" to an integer between 0 and half of the first parameter "N302", and setting the second parameter "T302" to 1 or half of the second parameter "T302" in seconds.

13. The mobile communication device of claim 12, wherein, when the first parameter "N302" is set to 0, the step of applying the decreased parameters for the cell update procedure comprises skipping the cell update procedure and entering an idle mode in the 3G cellular network to allow an early cell reselection procedure.

14. The mobile communication device of claim 12, wherein, when the first parameter "N302" is set to a non-zero value, the step of applying the decreased parameters for the cell update procedure comprises performing the cell update procedure according to the decreased parameters.

15. The mobile communication device of claim 14, wherein the Baseband processor is further configured to enter an idle mode in the 3G cellular network to allow an early cell reselection procedure, in response to failing the cell update procedure for a number of retries corresponding to the decreased first parameter "N302".

16. The mobile communication device of claim 10, wherein the AS abnormality is indicated from an AS to a Non-AS (NAS), and the NAS performs the step of decreasing the parameters and instructs the AS to perform the step of applying the decreased parameters for the cell update procedure.

17. A mobile communication device, comprising:
    a Baseband chip configured to detect a radio link failure or Radio Link Control (RLC) unrecoverable error when making a call in a cell of a third-generation (3G) cellular network; and a controller configured to reduce one or more parameters, which are obtained from the 3G cellular network, associated with a cell update procedure in response to detecting the radio link failure or RLC unrecoverable error, and instructs the Baseband processor to apply the decreased parameters for the cell update procedure to reduce a call recovery time for retrying the cell update procedure.

18. The mobile communication device of claim 17, wherein the AS abnormality is indicated from an AS to an Application (AP) layer, and the step of decreasing the parameters is performed by the AP layer which instructs the AS to perform the step of applying the decreased parameters for the cell update procedure.

19. The mobile communication device of claim 17, wherein the AS abnormality is indicated from an AS to an Application (AP) layer through a Non-AS (NAS), and the step of decreasing the parameters is performed by the AP layer which instructs the AS, through the NAS, to perform the step of applying the decreased parameters for the cell update procedure.

\* \* \* \* \*